United States Patent Office 3,109,018
Patented Oct. 29, 1963

3,109,018
RESOLUTION OF DL-MENTHOL
Kenneth A. Hanover, Scotch Plains, N.J., assignor to Chemetron Corporation, Chicago, Ill., a corporation of Delaware
No Drawing. Filed June 15, 1961, Ser. No. 117,292
5 Claims. (Cl. 260—475)

This invention relates generally to the resolution of racemic menthol into its optically active forms. More particularly, this invention relates to a method of resolving DL-menthyl hydrogen phthalate (or similar acid ester of a dibasic acid) with an optical isomer of 1-amino-1-naphthylethane, which is also known as α-(naphthyl)ethylamine and has the following formula:

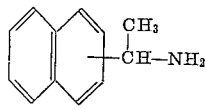

1-amino-1-naphthylethane exists in the form of two position isomers, namely, 1-amino-1-(α-naphthyl)ethane, wherein the side chain is located at the α-position of the naphthalene nucleus, and 1-amino-1-(β-naphthyl)ethane, wherein the side chain is located at the β-position of the naphthalene nucleus. Both of these position isomers exist in D- and L-forms and the four optical isomers are operative in this invention.

This invention is particularly directed to the improvement wherein a mole of DL-menthyl hydrogen phthalate is resolved by reaction with one-half mole of optically active 1-amino-1-naphthylethylamine and one mole of ammonia, whereby the optically active amine combines with one of the stereoisomers of DL-menthyl hydrogen phthalate and the crystalline salt is isolated from an aqueous suspension in high yield and in a state of high purity.

Menthol as its occurs in nature is in the form of L-menthol. It has heretofore been isolated from peppermint oils but its wide use for flavoring, confectionery and medicinal purposes and in the manufacture of mentholated cigarettes has occasioned the consumption of more L-menthol than can be obtained from natural sources. As a consequence, synthetic methods of producing optically active menthol have become important in commerce.

Synthetic menthol, such as that obtained by the catalytic hydrogenation of thymol or menthone, consists of racemic menthol in admixture with geometric isomers of menthol. The racemic or DL-menthol can be resolved through DL-menthyl hydrogen phthalate or DL-menthyl hydrogen succinate by reaction with optically active amines such as alkaloids. In conventional resolution procedures, one mole of DL-menthyl hydrogen phthalate is resolved with one mole of an optically active amine in a suitable organic solvent. As the optically active amines which have been used in prior resolution procedures are naturally occurring alkaloids or synthetic amines which have been previously resolved, they are expensive materials and any losses which are incurred of these materials contribute greatly to the cost of the resolution procedure. It is evident that any resolution procedure which will aid the economical use of optically active amines will be of great commercial importance.

It is an object of this invention to provide a method for resolving an acid ester of DL-menthol with a dibasic organic acid by procedures which are less expensive and more efficient than those used heretofore.

It is another object of this invention to provide a method for resolving DL-menthyl hydrogen phthalate or succinate which requires only one-half as much optically active amine as procedures used previously.

It is a further object of this invention to provide a method for resolving DL-menthyl hydrogen phthalate which provides for economic use and recovery of the optically active amine resolving agent.

These and other objects are apparent from and are achieved in accordance with the following disclosure.

Broadly, the present invention involves the discovery that only half the theoretical quantity of optically active amine is needed to resolve DL-menthyl hydrogen phthalate or similar acid ester of a dicarboxylic acid when the DL-menthyl hydrogen phthalate (or similar acid ester) is first combined with an equivalent quantity of ammonia to form DL-menthyl ammonium phthalate (or similar salt). Other water-soluble organic amines, such as methylamine, ethylamine, or mixtures thereof, can be used. The optically active amine is a stronger base than ammonia or the water-soluble organic amines which are operative in this invention and replaces the ammonia or amine in the DL-menthyl ammonium phthalate. The organic solvent is removed and water substituted therefor, whereupon the less soluble salt of the optically active amine and one stereoisomeric form of DL-menthyl hydrogen phthalate precipitates from the aqueous solution. The ammonium (or amine) salt of the other stereoisomeric form of DL-menthyl hydrogen phthalate is soluble in the aqueous solution and is thus easily separated from the other isomeric salt.

The procedure is conducted in a suitable organic solvent in which the reagents and products are soluble. One mole of DL-menthyl hydrogen phthalate in organic solvent is reacted with preferably about one mole of ammonia (or water-soluble amine) in organic solvent. Then one-half mole of optically active amine is added. The resulting products are soluble in the organic solvent (for example, methanol, ethanol, benzene and mixtures with water). The optically active amine combines with one stereoisomeric form of DL-menthyl hydrogen phthalate to form a complex salt which is soluble in organic solvents but insoluble in water. The other stereoisomeric form of DL-menthyl hydrogen phthalate remains combined with the ammonia or low molecular weight amine to form a simpler salt which is not only soluble in the organic solvent, but in water. The organic solvent is diluted with water or is evaporated and the residue diluted with water. The salt of one stereoisomeric form of DL-menthyl hydrogen phthalate and optically active amine is insoluble in the aqueous medium and forms an insoluble solid precipitate, while the salt of the other stereoisomeric form of DL-menthyl hydrogen phthalate and ammonia (or water-soluble amine) is soluble in the aqueous medium. The insoluble salt can be removed, purified and then decomposed, preferably by treatment with an acid such as hydrochloric, whereby the optically active organic amine is removed and can be recovered by neutralization and extraction, distillation or other conventional procedures. The optically active form of menthyl hydrogen phthalate is insoluble in the aqueous acid solution and can be separated therefrom by filtration. The optically active menthol can be released from the optically active menthyl hydrogen phthalate by conventional hydrolysis procedures.

Since one-half of the theoretical quantity of optically active amine is used in the procedure of this invention, the losses of this costly material are substantially reduced and the resolution procedure is markedly improved from an economic point of view. The yield of salt of the optically active amine with menthyl hydrogen phthalate is particularly high, being in the range of 85–90% of theoretical. The recovery of optically active menthol and optically active amine from this salt is substantially theoretical.

Racemic DL-menthyl hydrogen phthalate is composed of equal quantities of D-menthyl hydrogen phthalate and L-menthyl hydrogen phthalate. When a mole of DL-menthyl hydrogen phthalate is treated with one-half mole of L-α-(α-naphthyl)ethylamine and one mole of ammonia in a suitable organic solvent, the D-menthyl hydrogen phthalate preferentially combines with the L-α-(α-naphthyl)ethylamine and forms a salt which is soluble in the organic solvent. The L-menthyl hydrogen phthalate combines with the ammonia to form a salt which is soluble in both the organic solvent and in water. By removing the organic solvent, or by diluting the solution with water, or by combination of both procedures, the L-α-(α-naphthyl)ethylamine salt of D-menthyl hydrogen phthalate is precipitated in relatively pure form. By use of the other optical isomer of the optically active amine, namely, D-α-(α-naphthyl)ethylamine, a precipitate of the L-menthyl hydrogen phthalate salt of D-α-(α-naphthyl)ethylamine is formed. This can be decomposed into D-α-(α-naphthyl)ethylamine and L-menthol.

The procedure of this invention can be applied to a resolution of DL-menthyl hydrogen phthalate and DL-menthyl hydrogen succinate as well as similar acid esters of DL-menthol. It is applicable to a variety of optically active amines including brucine, cinchonine, cinchonidine, hydroxyhydrindamine, menthylamine, morphine, α-phenylethylamine, quinidine, quinine, strychnine, ephedrine and pseudo-ephedrine. The preferred amine is α-(α-naphthyl)ethylamine in both its D- and L-forms.

By similar techniques it is possible to combine optically active amines with specific optical isomers of DL-menthyl hydrogen phthalate and related acid esters of menthol. Reactions are conducted at relatively low temperatures between about 20° and 100° C. in suitable organic solvents. It is not necessary to fractionally crystallize the reaction mixture since two different salts are formed by this procedure, one salt being formed from one optical isomer of menthyl hydrogen phthalate (or related acid ester) and the optically active amine, and the other salt is that formed from the other isomer of menthyl hydrogen phthalate and ammonia or water-soluble amine. Since the respective salts are substantially different in their solubilities, particularly in aqueous solvents, a separation thereof is readily achieved without fractional crystallization. The salt of menthyl hydrogen phthalate and the optically active amine is of low solubility in water, whereas the ammonia (or water-soluble amine) salt has relatively high solubility in water. Consequently, when aqueous solvents are used the ammonia salt remains in solution and the salt with the optically active amine precipitates. Since this is not a fractional crystallization procedure, it is not necessary to reduce the temperature of the solution to precipitate one of the salts and the separation can be accomplished at room temperature or slightly higher temperatures in aqueous solvents wherein the ammonia salt remains in solution and the optically active amine salt is insoluble.

Organic solvents which are miscible with water are generally applicable to this invention. These include methanol, ethanol, isopropanol, propanol, acetone, methyl ethyl ketone, dioxane and related inert organic liquids. Benzene is an appropriate solvent for the reaction of DL-menthyl hydrogen phthalate, aqueous (28%) ammonia and L-α-(α-naphthyl)ethylamine since the resulting salts are soluble in benzene.

The invention is disclosed in more detail by means of the following examples which are provided merely for purposes of illustration and are not intended to limit the invention in scope. It will be apparent to those skilled in the art that numerous modifications and equivalent materials and operating conditions can be adopted without departing from the invention.

Example 1

750 grams of DL-menthyl hydrogen phthalate was dissolved in 750 cc. of methanol and 203 cc. of concentrated (28%) aqueous ammonia was added. To the resulting solution was added 210 grams of L-α-(α-napthyl)-ethylamine, and the temperature was kept at about 40° C. A clear solution was formed in the aqueous methanol. Then three liters of water was added with good agitation over a period of 4-6 hours, during which time a crystalline precipitate of L-α-(α-naphthyl)ethylamine salt of D-menthyl hydrogen phthalate was formed. After all of the water was added, the methanol was removed by distillation under vacuum. The removal of the methanol caused complete precipitation of L-α-(α-naphthyl)ethylamine D-menthyl phthalate, forming an aqueous slurry of the salt. The slurry was cooled to about 10-15° C. and filtered. There was thus isolated an 88 percent yield of L-α-(α-naphthyl)ethylamine D-menthyl phthalate having a specific rotation of +45° (c.=10 in methanol). After recrystallization, the specific rotation was raised to +48°.

Example 2

A solution of 750 grams of DL-menthyl hydrogen phthalate dissolved in 750 cc. of methanol was treated with 2.5 moles of concentrated aqueous ammonium hydroxide solution. Then 210 grams of D-α-(α-naphthyl)-ethylamine was dissolved in the warm solution (40° C.). The solution was maintained at 40° C. while 2800 cc. of water was added over a period of about 5 hours. The methanol was removed under vacuum and the aqueous solution cooled and the precipitate of D-α-(α-naphthyl)-ethylamine L-menthyl phthalate was removed by filtration. An 89% yield of product having a specific rotation of −45° was obtained. On recrystallization the rotation was raised to −48° (c.=10 in methanol).

Example 3

The aqueous solution of L-menthyl ammonium phthalate containing some D-menthyl ammonium phthalate which was obtained in Example 1 as a filtrate in the filtration of L-α-(α-naphthyl)ethylamine D-menthyl phthalate was heated to 40° C. and treated with a warm solution of 210 grams of D-α-(α-naphthyl)ethylamine in 750 cc. of methanol. A crystalline precipitate of D-α-(α-naphthyl)ethylamine L-menthyl phthalate began to form soon after the amine solution had been added. The methanol was removed under vacuum and an aqueous slurry of D-α-(α-naphthyl)ethylamine L-menthyl phthalate was formed. The slurry was cooled to about 15° C. and filtered to remove the D-α-(α-napthyl)ethylamine L-menthyl phthalate. A 90% yield of product having a specific rotation of −48° (c.=10 in methanol) was obtained.

What is claimed as new and desired to be secured by Letters Patent of the United States is:

1. Method of resolving DL-menthyl hydrogen phthalate which comprises reacting said DL-menthyl hydrogen phthalate in a water-miscible organic solvent with the stoichiometrically equivalent amount of a base selected from the group consisting of ammonia and organic amines which are miscible with water in all proportions and one-half the stoichiometrically equivalent quantity of an optically active organic amine which is a stronger base than the base defined above and which has a solubility in water not greater than about 5 parts by weight per 100 parts of water, removing the water-miscible organic solvent, separating the insoluble salt of the optically active organic amine and one stereoisomer of DL-menthyl hydrogen phthalate, and recovering the optical isomer of DL-menthyl hydrogen phthalate from said salt.

2. Method of claim 1 wherein the optically active organic amine is an optically active form of α-(α-naphthyl)-ethylamine.

3. The method of claim 2 wherein the water-miscible organic solvent is methanol.

4. The method of claim 3 wherein the base is ammonia.

5. Method of producing L-menthol which comprises reacting DL-menthyl hydrogen phthalate in a water-miscible organic solvent with the stoichiometrically equivalent quantity of aqueous ammonia and one-half the stoichiometrically equivalent quantity of D-α-(α-naphthyl)ethylamine, diluting the solution with water until the D-α-(α-naphthyl)ethylamine salt of L-menthyl hydrogen phthalate begins to precipitate, evaporating the water-miscible organic solvent under reduced pressure, removing the D-α-(α-naphthyl)ethylamine L-menthyl phthalate and recovering L-menthol from said salt.

References Cited in the file of this patent

Puetzer et al., J. Am. Pharm. Soc. 35, 127–8 (1946).
Fieser and Fieser, Organic Chemistry (New York, 1950), pages 267–271.